United States Patent [19]
Arpajian

[11] 3,819,312
[45] June 25, 1974

[54] COLD RUNNER INJECTION MOLD FOR THERMOSETTING RESINS

[75] Inventor: Vasken Frank Arpajian, Huntingdon Valley, Pa.

[73] Assignee: Pennwalt Corporation, Philadelphia, Pa.

[22] Filed: July 25, 1972

[21] Appl. No.: 275,032

[52] U.S. Cl............................. 425/242 R, 425/243
[51] Int. Cl................................................ B28b 1/24
[58] Field of Search........ 425/450, 450 C, 451, 243, 425/244, 143, 144, 247, 250; 249/79; 164/306, 311, 312

[56] References Cited
UNITED STATES PATENTS

| | | | |
|---|---|---|---|
| 2,279,344 | 4/1942 | Reid | 425/450 X |
| 2,865,050 | 12/1958 | Strauss | 425/243 |
| 2,871,517 | 2/1959 | Allard | 425/250 X |
| 3,591,897 | 7/1971 | Perras | 425/144 |

Primary Examiner—J. Spencer Overholser
Assistant Examiner—John J. Brown
Attorney, Agent, or Firm—Stanley Bilker

[57] ABSTRACT

A cold runner mold for injection molding of articles from thermosetting resins includes a relatively cool centrally disposed sprue passage which is thermally insulated from the hot cavity sections by air gaps. A transition zone between the cold runner section and the cavities is provided by a series of conical canals, one for each mold cavity, leading from the cool sprue passage and converging into hot wells in communication with the respective mold cavities at the mold parting line.

9 Claims, 5 Drawing Figures

COLD RUNNER INJECTION MOLD FOR THERMOSETTING RESINS

This invention relates to injection molding apparatus, and more particularly relates to a mold construction for injection molding of thermosetting resins.

In conventional injection molding of thermosetting resins, plasticized material is injected from an extrusion cylinder into a central sprue which through a distribution system consisting of branching channels or runners directs the melt into heated mold cavities defining the external configuration of the article to be molded. As a result of the application of heat and pressure, the thermosetting resin which was initially in a liquid or plastic condition during injection is polymerized or cured and converted into a hardened solid state. Because the materials in the sprue passageways and the runners are similarly exposed to the heat and pressure, they also are cured and become set into a hardened tree-like mass which is ejected along with the molded articles when the mold is opened. However, since thermosetting materials, once they have been polymerized, cannot be reused, the cured sprue and runner system essentially becomes waste and is scrapped. The actual amount of scrap in the sprue-runner system depends for most part upon the configuration of a particular mold. For example, a mold having few cavities for relatively large parts may produce a runner-scrap to molded part ratio of approximately 5 percent while a multicavity mold for tiny parts may result in a scrap ratio that is several times the molded part's weight.

It is therefore an object of this invention to provide a mold construction for injection molding of thermosetting materials in which the amount of runner scrap is kept to a minimum.

Another object of this invention is to provide a mold construction in which the injected materials are subject to curing substantially only within the mold cavities themselves while the materials within the runner distribution system are maintained in plastic non-cured disposition for subsequent introduction into the mold cavities during the next injection shot.

Yet another object of this invention is to provide a cold runner system for injection molding of thermosetting resins wherein the runner-sprue distribution network is easily accessible for cleaning.

Still another object of this invention is to provide a cold runner system for injection molding thermosetting materials wherein the transition between cured and non-cured conditions is confined within small discreet zones adjacent the mold cavities.

Still a further object of this invention is to provide a cold runner mold for injection molding thermoplastic materials in which the cooling system requires no O-rings or gaskets.

Other objects of this invention are to provide an improved service of the character described which is easily and economically produced, sturdy in construction, and both highly efficient and effective in operation.

With the above and related objects in view, this invention consists of the details of construction and combination of parts as will be more fully understood from the following detailed description when read in conjunction with the accompanying drawings, in which.

Referring now in greater detail to the drawings in which similar reference characters refer to similar parts there is shown a cold runner mold system, generally designated as A, for use in an automatic injection molding apparatus, generally designated as B.

Figure 1:
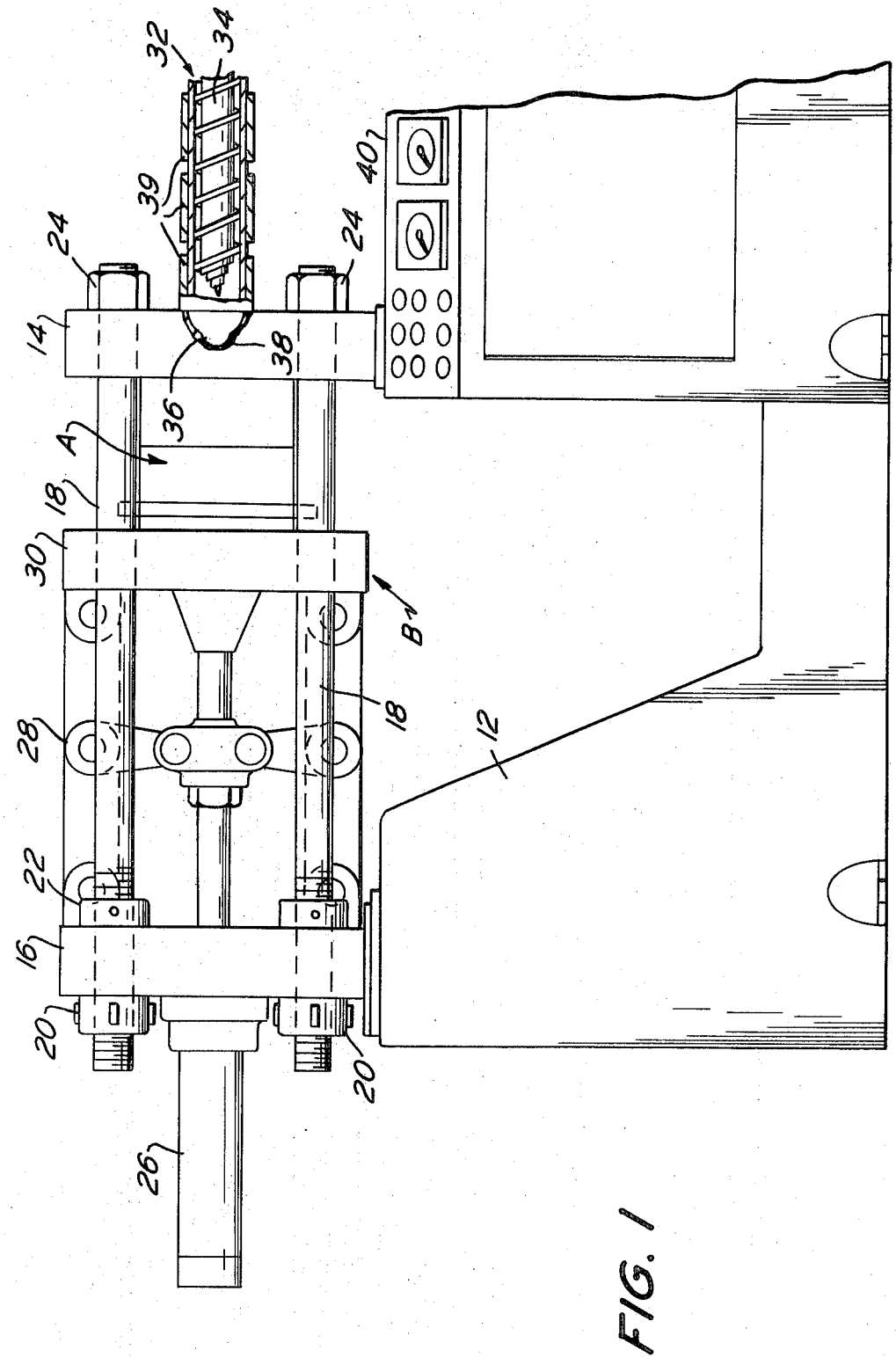
FIG. 1 is a side elevational view of an apparatus for injection molding thermosetting materials which includes a cold runner mold embodying this invention.
Figure 2:
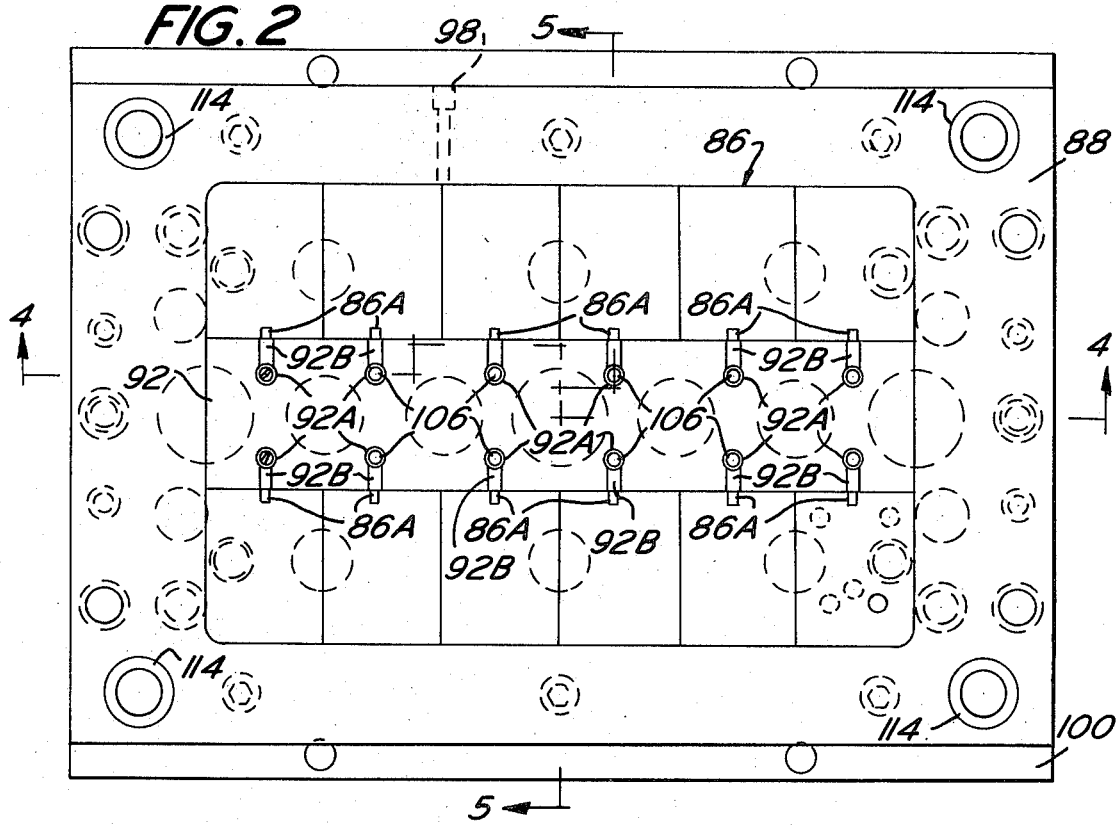
FIG. 2 is a plan view of the force plate portion of the mold taken generally along lines 2—2 of FIG. 4.
Figure 3:
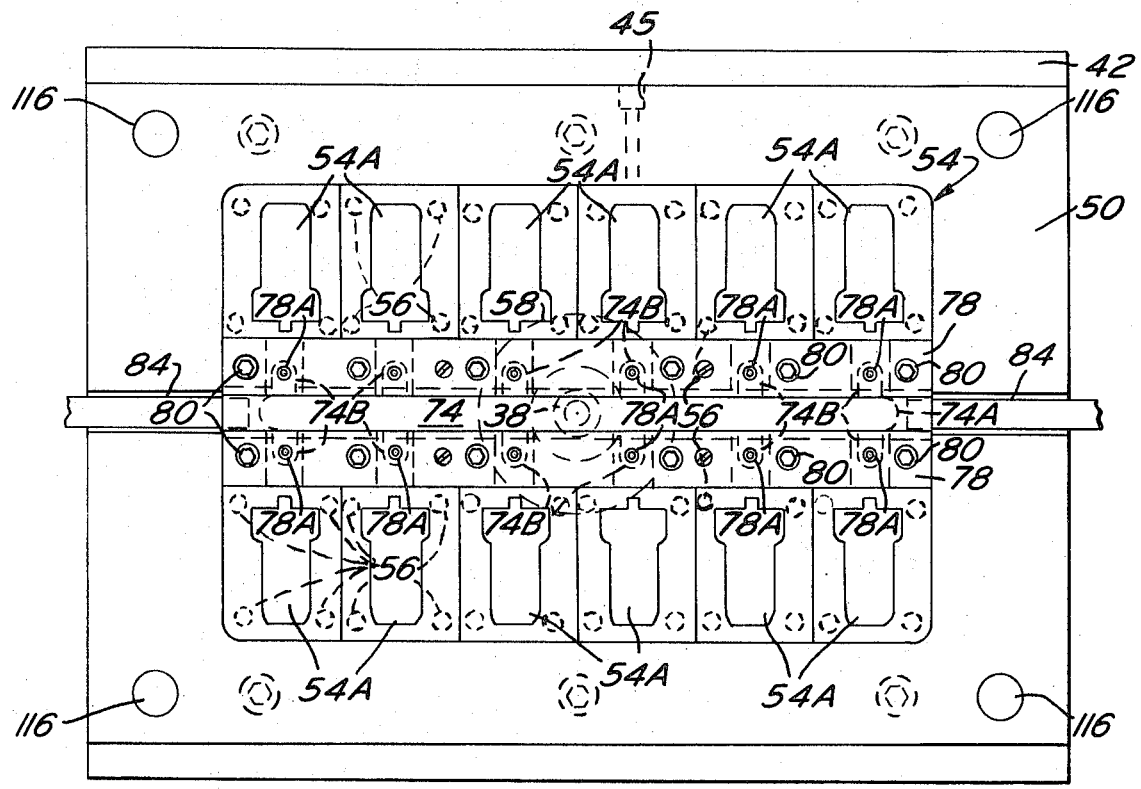
FIG. 3 is a plan view of the cavity portion of the cold runner mold taken generally along lines 3—3 of FIG. 4.

The injection molding apparatus itself is entirely conventional, and as illustrated in FIG. 1 comprises a horizontal clamping machine in which injection is accomplished through a sprue bushing located at the centerline of the mold. However, the invention is equally applicable (1) to a horizontal clamping system in which injection is performed at the mold parting line or (2) to a vertically clamping machine with injection effected at the mold parting line. The injection molding apparatus B includes a bed or frame 12 at the head of which is secured a stationary platen 14 and at the opposite end a fixed support plate 16. Four quadrilaterally spaced tie rods 18 are affixed to the support plate 16 by locking nuts 20 and 22 and are further affixed to the stationary platen 14 by head locking nuts 24. A hydraulic piston actuator 26 acts through a clamping mechanism 28 to slidably reciprocate the movable platen 30 on the rods 18 with respect to the stationary platen 14.

In general, the mold A comprises two halves or sections, one half being affixed to the stationary platen 14 while the other half is coupled to the movable platen 30. An extrusion barrel 32 having an internal reciprocable and rotatable screw 34 is adapted to be mounted in the frame 12 so that the barrel nozzle 36 is in abutment with a complementary depression in the sprue bushing 38. Band heaters 39 circumferentially embrace the barrel 32 for the purpose of applying the appropriate temperature to the shot being prepared for injection. Thermosetting resin powder is fed into the rear portion of the barrel 32 from a suitable hopper (not shown). As the screw 34 is rotated, the resin is plasticized and collected in the forward portion of the barrel. Meanwhile, the screw axially retreats in the barrel against a predetermined hydraulic back pressure. When the required amount of heated plasticized material has been accumulated in advance of the screw 34, the screw is reciprocated in a forward direction to inject the heated and plasticized shot into the mold cavities defined by the registering clamped together mold sections. A control panel 40 permits the various phases of the injection molding operation to be set up by the operator in regard to temperatures, pressures, time sequences, and the like.

Figure 4:
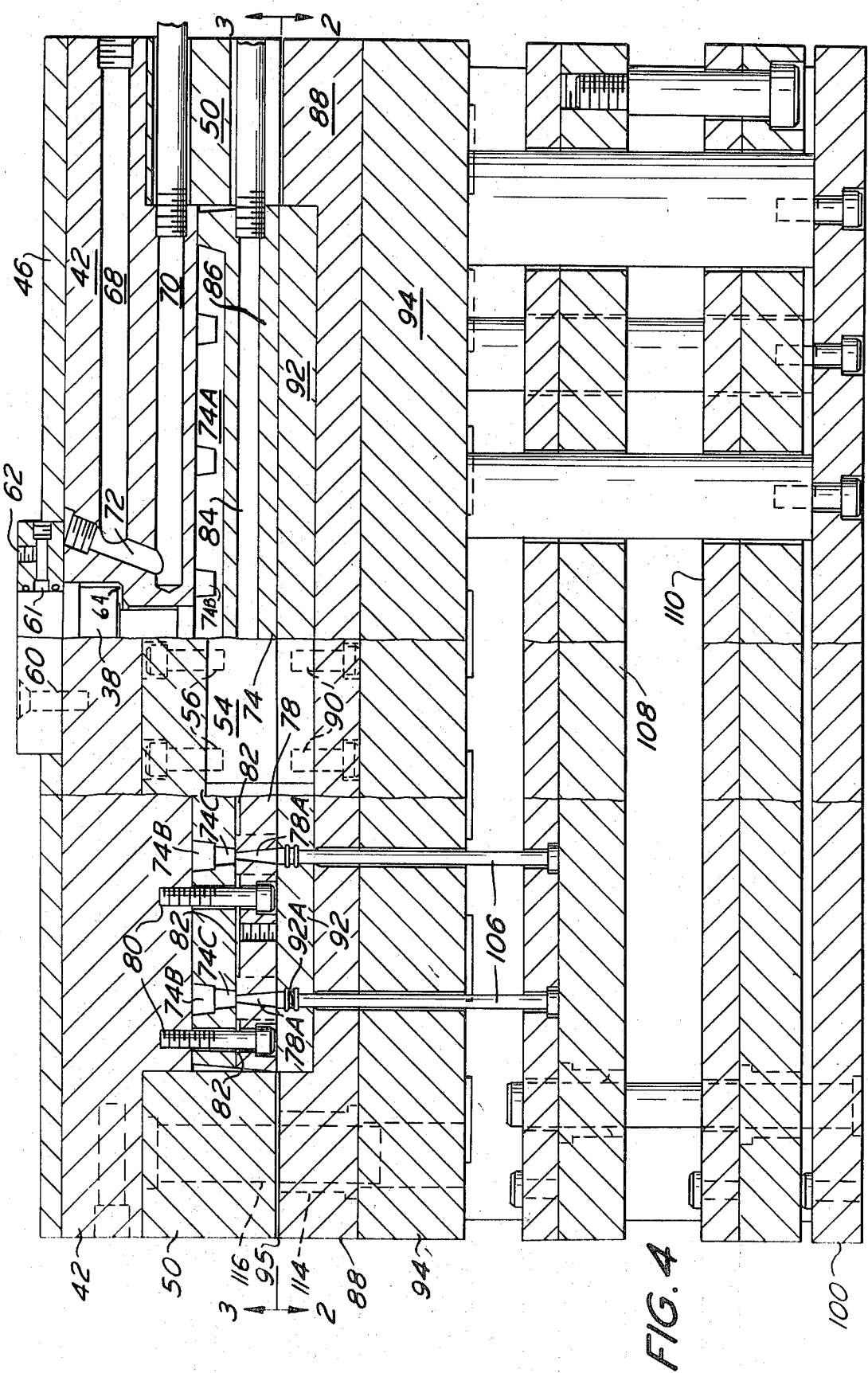
FIG. 4 is a sectional view taken along lines 4—4 of FIG. 2.
Figure 5:
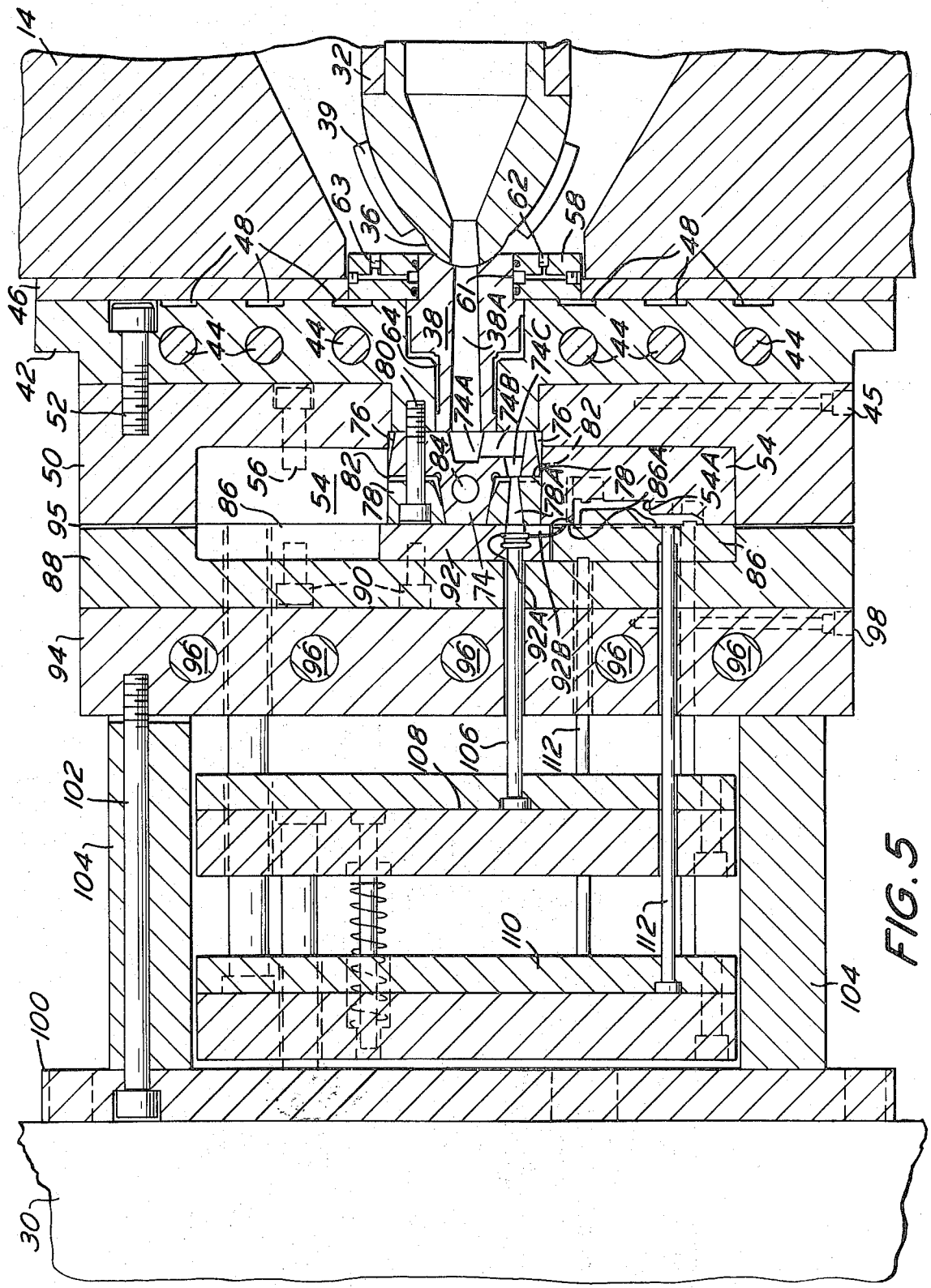
FIG. 5 is a sectional view taken along lines 5—5 of FIG. 2.

Referring now to FIGS. 4 and 5, the stationary mold half includes a heating platen 42 which is affixed to the face of stationary platen 14 in a conventional manner by dogs or screws (not shown). Cartridge heaters 44 are incorporated within bores extending within the heating platen, and a thermocouple may be inserted within a well 45 for measuring and controlling the platen temperature. A layer of insulating material 46, such as asbestos sheet, is interposed between the adjacent surfaces of the heating platen 42 and the stationary platen 14 in order to reduce heat transfer to the press frame 12 and clamping mechanism 28. A series of parallel slots 48 in the face of the heating platen 42 adjacent the insulation 46 act as air gaps to minimize heat conduction. Mold retainer plate 50 is affixed to the heating platen 42 by means of cap screws 52 which extend through counterbored holes in the platen and threadedly engage tapped openings in the retainer plate. A multicavity mold 54 including individual cavities 54A is secured within the retainer plate 50 by cap screws 56 extending through counterbored holes in the retainer plate and engaging threaded openings in the mold cavity blocks. The foregoing elements define the "hot" portion of the stationary mold half, the "cold runner" portion of this invention being embraced thereby and now to be described.

The sprue bushing 38 is retained within the heating platen 42 and the retainer plate 50 by a locating ring 58. The ring 58 is fitted about the periphery of the sprue bushing 38 and is secured to the heating platen 42 by flathead screws 60. The inner margin of the ring 58 is undercut at 61 to define a channel for circulation of water at a controlled temperature introduced through inlet port 62 and discharged through exit port 63. The medial periphery of the sprue bushing 38 has reduced diameter portions to define an air gap 64 which acts as an insulative barrier impeding the transmission of heat by conduction between the platen 42 and the sprue bushing. A pair of conduits 68 and 70 bored through the heating platen 42 from opposite edges thereof are coupled by a cross bore 72 adjacent the sprue bushing 38. Controlled temperature water circulated through the conduits 68, 70 and 72 enables the sprue bushing 38 and the central channel 38A thereof to be retained in a relatively cool condition inhibiting curing of the plasticized melt stream being injected therethrough. An elongate runner plate 74 of generally T-shaped cross section is adapted to carry and distribute the plasticized melt from the sprue passage 38A to the mold cavities. The runner plate 74 includes a longitudinally extending channel 74A which is in communication with the sprue passage 38A and a plurality of secondary channels 74B which branch off from the main channel 74A. Tapered canals or orifices 74C, one for each mold cavity, are incorporated in the ends of the branch channels 74B, and direct the melt through corresponding reverse tapered canals 78A in runner plate retainer bars 78. One retainer bar 78 is mounted on each side of the central section of the runner plate 74, and screws 80 passing through aligned openings in the retainer bars and the T-portions of the runner plate 74 threadably engage tapped holes in the heating platen 42. The upper and lower edges of the T-portion of the runner plate 74 are angularly relieved to define air gaps 76 of wedge shaped configuration between the runner plate and the adjacent portions of the mold retainer plates 50 and the molds 54 to insulate the "cold" runner from the adjacent "hot" zones. In addition, a series of slots 82 are undercut along the faces of the runner retainer bars 78 adjacent the runner plate 74 in order to reduce the transmission of heat therebetween by conduction adjacent the tapered "cold" canals 74C. The runner plate 74 is kept cool relative of its environment by passing water at a controlled temperature through a bore 84 longitudinally extending entirely therethrough. The conical canals 78A in the retainer bars 78 are reversely tapered with respect to the canals 74C in the runner plate to define an hourglass configuration and form transition zones within which the thermoplastic material is converted to a fully cured state during each molding cycle. It is the function of the transition zone to encapsulate the maximum extent of the cured sprue so that it does not exceed the length of the conical canals 78A. The conical configuration of the cured plugs within the canals 78A readily permits their extraction when the press is opened at the end of each molding cycle.

It is to be observed that the central portion of the runner plate 74 is keystone shaped in section and the portions of the retainer bars 78 adjacent thereto are wedge shaped in order to simplify removal of the runner plate should the cured transition zone accidentally extend back into the channels 74C, 74B, 74A and 38A, an area which is intended to retain only liquid plastic resin. It is also to be noted that the wedge shaped edges of the retainer bars 78 are undercut at an angle as continuations of the slots 82 and act as further insulating air gaps for the cold runner plate 74.

The movable portion of the mold A acts essentially as a "hot" section which includes a core 86 secured within a plunger plate 88 by cap screws 90. The core 86 is adapted to be urged into complementary abutment with the mold cavity portion 54 along parting line 95 to define the molded article or part. A medial strip 92 is secured to the plunger plate 88 by cap screws 90 so as to symmetrically divide opposing sections of cores 86. The plunger plate 88 is secured by screws (not shown) to movable heater platen 94 in a manner substantially identical to the way in which the mold retainer plate 50 is tied to the stationary heater platen 42. Cartridge heaters 96 are inserted within longitudinally extending bores in the platen 94, and well 98 is adapted to receive a thermocouple for measuring and controlling heater platen temperature. The heating platen 94 is carried on a heel plate 100 by means of elongate screws 102 which extend through spacer legs 104. The heel plate 100 is then tied or secured to the face of the movable platen 30 by suitable dogs or screws (not shown) all in a manner well known in the art.

Sprue ejector pins 106 projecting from runner ejector plate 108 extend through respective aligned openings in the heater platen 94, in the force plate 88 and in the medial strip 92. A hot well 92A is defined in the medial strip 92 opposite each of the transition tapered canals 78A coextensive with the opening through which the sprue ejector pins 106 extend. Thus, each of the tapered canals 78A empty into a hot well on the opposite side of the parting line 95. The hot wells 92A act to deliver the melt through short runners 92B and gates 86A directly into the cavities 54A. Spaced circumferential undercuts in the hot wells 92A form flanges on the base of the plugs which set up therein as the plastic material is cured within the mold cavities and thus retain the relatively short cured runner sections as well as the material in the canals 78A upon the movable mold half when the press opens. After the press has opened along the parting line 95, a suitable actuating cylinder (not shown) causes the runner ejector plate 108 to reciprocate such that the sprue ejector pins 106 extend beyond the surface of the plunger plate 88 to expel the short sprue sections cured within the runners 92B as well as the hot well plugs and the partially cured tapered portions coupled thereto defined within the transition zones 78A. Immediately thereafter, pin plate 110 carrying part ejection pins 112 is reciprocated toward the stationary mold half to expel the molded components projecting from the forces or cores 86. The manner and sequence of operation of the sprue and part ejection system is well known and requires no further description in respect to the instant invention. However, in passing it is deemed worthy of mention that guide pins 116 projecting from the retainer plate 50 on the stationary mold half are adapted to slidably engage within bushings 114 in the movable mold half to assure alignment of the two sections.

As is apparent from the foregoing description, the total extent of the cured sprue is limited to the length of the plug which is cured within the transition zone plus the adjoining hot well plug and the intermediate short runners coupled thereto extending up to the mold gates. By means of the cooling water circulating through the ports 68, 70, 72 and 84, the cold runner plate 74 and the sprue bushing are kept at a temperature in the range of 220°F to 300°F to inhibit polymerization of the runner materials in these zones during a full machine cycle. The relatively cool area extends up to the transition zones within the reverse tapered canals 78A on the other side of which the temperature within the cavities and forces will range from approximately 300°F to 360°F. The tapered canals 78A minimize the front between cured and partially cured portions. The hot wells 92A act as traps to receive the front of flow of the next shot thus capturing any small slugs of cured material before they enter the mold cavity. Heat transfer from the hot zone to the cool runner zone is minimized by the inclusion of the air gaps 64, 76, and 83 embodied therebetween. By virtue of the wedge shaped configuration of the runner plate 74 and retainer bars 78, all parts may easily be disassembled for cleaning should any of the cold runner channels plug as a result of curing of the thermosetting material therein.

Although this invention has been described in considerable detail, such description is intended as being illustrative rather than limiting since the invention may be variously embodied without departing from the spirit thereof, and the scope of the invention is to be determined as claimed.

What is claimed is:

1. A cold runner system for injection molding of articles from thermosetting resins comprising:
    a mold cavity section,
    a plunger section reciprocable into abutting registration with said mold cavity section to define about a parting line thereof at least one cavity delineating the external configuration of the article to be molded,
    a relatively short runner channel for each said cavity disposed along the parting line and including a gate leading to the associated cavity at one end,
    a well disposed in said plunger section in communication with the other end of each said runner,
    means for heating said mold cavity and plunger sections to establish curing conditions for thermosetting material injected into each cavity,
    a sprue passage embraced within said mold cavity section including means for thermally insulating said sprue passage from said mold cavity section and said means for heating,
    means for cooling said sprue passage to a temperature which inhibits curing of the thermosetting resin being delivered therethrough, and
    a tapered canal for each of said wells, each canal having an axis in direct alignment with the corresponding well and converging therefrom adjacent the parting line to an orifice coupled with said sprue passage to define a transition zone therein on the upstream region of which the thermosetting resin remains plastic and on the downstream region of which the resin becomes cured, each of said wells defining a trap for capturing partially cured slugs of resin so as to prevent passage thereof into the mold cavity associated therewith.

2. The invention of claim 1 the orifice leading from the sprue passage to said tapered canal axially converges in the direction toward the tapered canal to define an hourglass configuration.

3. The invention of claim 2 wherein the means for thermally insulating said sprue passage from said mold cavity section comprise air gaps.

4. The invention of claim 3 wherein the sprue passage includes an elongate plate of generally T-shaped cross section and having bore extending therethrough for introduction of cooling water.

5. The invention of claim 4 wherein the edges of the T-shaped elongate plate are angularly relieved to facilitate disassembly.

6. A cold runner system for molding articles from thermosetting resins expressed through an injection nozzle, comprising:
    a first mold cavity section,
    a second mold cavity section,
    means to reciprocate said first and second mold cavity sections with respect to each other to define about a parting plane thereof a plurality of cavities delineating the external configuration of the articles to be molded,
    means for heating said first and second mold cavity sections to establish curing conditions for thermosetting material injected into said cavities,
    a sprue passage embraced within said first cavity section and communicating with the injection nozzle,
    means for thermally insulating said sprue passage from said first mold cavity section and said means for heating,
    means for cooling said sprue passage to a temperature which inhibits curing of the thermosetting material being delivered therethrough,
    a plurality of canals in said first cavity section communicating with said sprue passage, each canal having an axis substantially perpendicular to the parting plane and terminating thereat,
    a plurality of wells disposed in said second cavity section at the parting plane and in direct alignment with respective canals, and
    short runner channels in at least one of said mold cavity sections adjacent the parting plane interconnecting respective cavities with the canals, whereby said canals define transition zones on the upstream portions of which the thermosetting resin remains plastic and on the downstream portions of which the resin becomes cured and wherein said wells define traps for capturing partially cured slugs of resin so as to prevent passage thereof into the mold cavities.

7. The invention of claim 1 wherein said canals are tapered and diverge in a direction toward said wells.

8. The invention of claim 6 wherein each of said canals are of hourglass configuration.

9. The invention of claim 6 wherein said sprue passage is included in an elongate plate of generally T-shaped cross-section and having a bore extending therethrough for circulating coolant.

* * * * *